7414X.
J. Bearce.
Ship Building.
Patented Feb. 7, 1833.
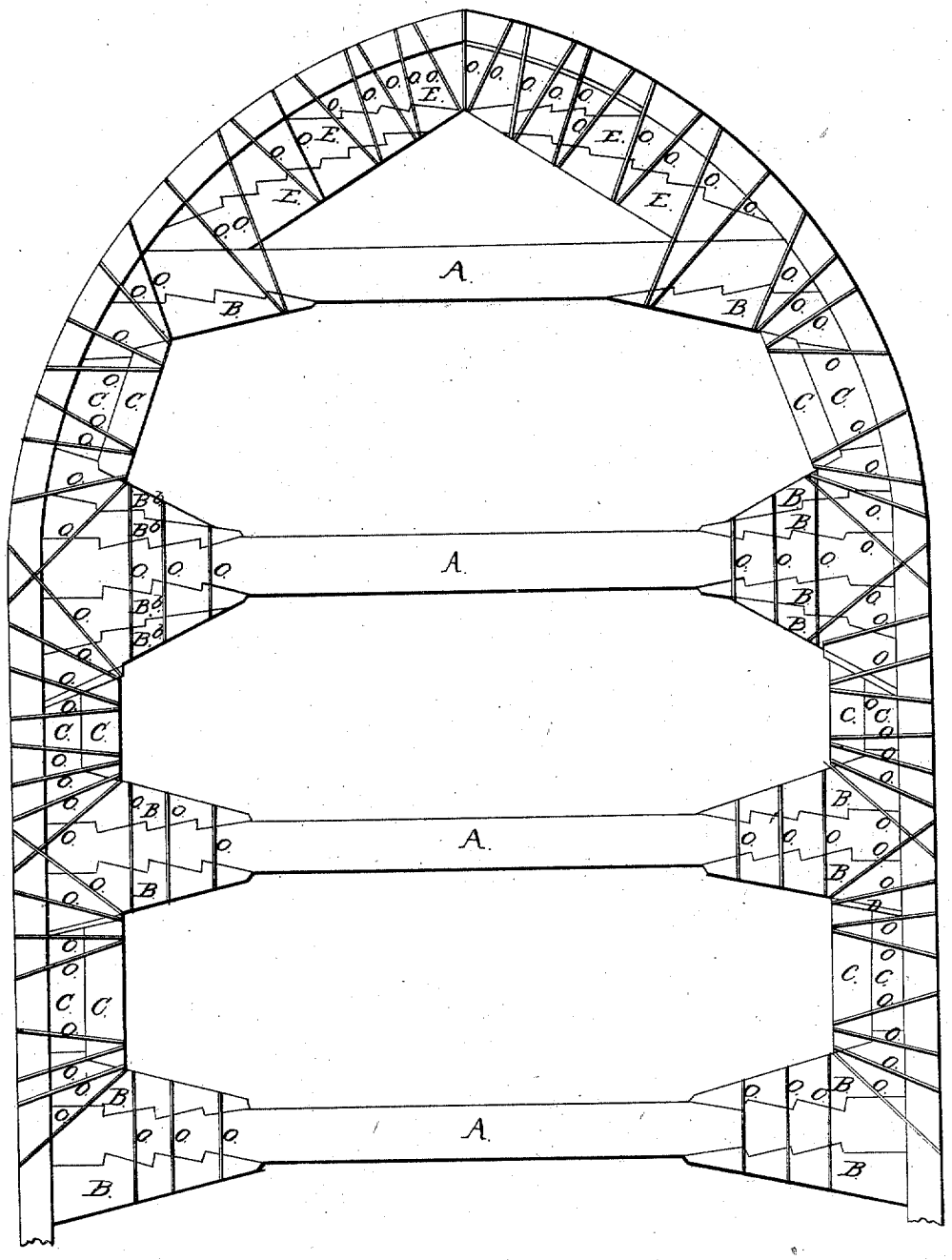
N. PETERS, PHOTO-LITHOGRAPHER, WASHINGTON, D. C.

14144 John Bearce Bristol Maine

Feb 7. 1853

Letters Patent

The schedule referred to in these Letters Patent and making part of the same Containing a description in the words of the said John Bearce himself of his improvement in framing kneeing off and Securing a Ships or other Vessels deck which he styles a lock dovetail key purchase To all whom these presents shall come Be it known that I John Bearce of Bristol in the County of Lincoln and State of Maine have invented a new and useful improvement in framing kneeing and securing a Ships or other Vessels deck — which I Style a "Lock dovetail key purchase" and that the following is a full and exact description of the Construction of the frame of a Ships deck constructed in the method aforesaid as invented by me, referring to the plan hereto annexed The [illegible] of the Ships are represented on said plan by the [illegible] side of the Ship. A represents the beams extending from side to side the ends of which are notched to fay to the Checks. B represents the Lock Checks locked and fayed to the beams and sides of the Ship as represented in the plan, It may be observed that there may be one or more of these Lock Checks on each side of the beams, as the Ship may happen to be Convenient If the Ship be small two of them may be made and put together equally as strong as a check from one piece as may be seen at B.b. C in the plan represents the filling in Checks between the Lock Checks. There may be either one or two of these between the beams as may be most convenient. It makes no difference as to the Strength If they be made in one piece it will be observed in the plan that they must be made with a Shoulder to fayh the Lock Checks D represents they keys driven in between the Lock Checks and the filling in Checks [illegible] the whole work together [illegible] it is impossible to [illegible] in the slightest degree To prevent the key from Starting after it is driven a Spike should be drove into the end of it. B represents a beam [illegible] framed after the manner of the Lock dovetail purchase it being much more easily obtained

[illegible] 74147 as almost any) timber will make one, and is also much better and stronger than a common breast hook O represents the bolts which it will be observed are driven in square braced & [illegible] and are to be rivetted on copper or iron plates extending across the Chocks These bolts need not be more than two thirds the size of bolts required for vessels framed with knees in the usual way. The advantages of securing the deck of a ship with straight wood in the manner of the Lock dovetail Key purchase instead of knees are two First the timber is much less expensive and more easily obtained Secondly It is very much stronger and cannot work but must continue firm as long as the wood remains sound. To frame a deck in this manner I take a piece of timber say five feet long fourteen inches wide and nine inches thick (according to the size of the ships) and split it obliquely thus  I then put the straight grain sides in to the end of the beam with score locks 1½ inch deep, fayed on to the beam (into which locks have been cut in the same way) before the beam is put into the vessel. The wood thus fayed on to the beam I call a Lock Chock one of them must be on each side of the beam & at both ends. It will be readily perceived that they are much cheaper & more easily obtained than knees & when bolted as in the plan must be much stronger. Between the chock on one beam and that on the other I put in what I call a filling in Chock. This may either be one or two pieces if in two pieces the inner one may be of pine or any other soft wood being equally as good as oak. The outer one should be of hard wood say nine inches thick and the inner one eight inches thick made to fay with a shoulder cut into the Lock Chocks. A space should be left between one end of the filling in Chock and the Lock Chock for a Key which should be made with half an inch drift.

Having fayed the filling in Chocks as before mentioned I proceed to bolt them with four bolts extending from the outside of the Ship square and braced and being rivetted upon thick plates of iron extending across and let into the filling in Chocks so that they cannot split I then drive the keys as taught as can be driven so as to set every joint wood & wood and secure the end

71214X of the key with a Spike. When this is done it will be found that the side of the vessel is drawn close to the beam and cannot be spread [illegible]. I then proceed to bolt the Ship as the plan describes, I drive the [illegible] bolts a throat bolt from the outside of the Ship through the Deck Checks in the end of the beams so that they cross each other in going through & fore lock them on iron plates on the inside. I then drive the fore and aft bolts through the Checks and beams say two or three bolts through and through & fore lock or rivet them.

The bolts being thus driven crossing each other it will be seen that no strain can draw them through and coming through the inside Square and rivetted or fore locked on a plate extending quite across the Check there can be not the slightest give to the work the more strain on the vessel the tighter the work draws. In the common mode of kneeing a vessel we are compelled to use knees with much Sap & many times with small arms which can hardly be bolted without splitting. In this way we can easily obtain timber free from Sap.

Knees are difficult to be obtained and are expensive. Checks are got out of pieces of timber which would be wasted or thrown away & cost comparatively nothing. If your timber be small you can lock Check on Check & make as strong work as if your timber were large. When a beam is kneed in the old way if it rots it is difficult to take it out as well as expensive. In this way there is no difficulty & if one end of the beam rots it can be sawed off & long Checks Spliced on to the beam and then be keyed up as strong and solid as ever without disturbing the deck. When a vessel deck is framed in this way I have found from actual experiment that it is so solid that in a high deck vessel of two hundred tons without twenty four feet beam I was unable by driving my stanchions over so taught under the beams to raise them half an inch.

This method is not only much stronger, but decidedly handsomer than any other - the work being Square with no crevices whereas knees are of almost all forms and shapes. It is much stronger than are knees - as their strength depends

[illegible] 74147 on their bolts alone without locks or dovetails This method is peculiarly
useful in an armed Vessel where great Strength is wanted the beams
being so secured to the sides so that the ship could not in any [illegible]
The Standard Knees & hanging & dagger knees &c. used in double decked
Ships which take up so much room are all dispensed with in this plan
& the Ship still Stronger. I have built one Vessel the present season upon this
plan & had no idea of the difference in Strength until I tried the experiment
The fact is the work cannot Start - The wood must either rot or break
Upon this plan Soft wood it is believed is nearly or quite as good as
oak or hard wood.
The objection to Soft wood has been that it would not
hold the fastening, In this method that is not an objection for the wood is
so locked and dovetailed together that it is strong without fastening. It
does not require more iron or Copper than the usual method
I would recom-
mend that all the Chocks be put together with white lead or varnish in the
joints & have the Key dove dipped in lead or varnish It will be seen
that a breast hook made in this way may be extended by being locked
together as far as you please & fayed to the forward beam making the bow
of your Ship Stronger By this method there is no necessity of reducing
the ends of the beams for the larger they are at the ends the better. If the ends
of the beams are large they may be locked to the smaller piece of timber
will be required for the chocks

[illegible] Witnesses — John Pearce
[illegible] Albert Smith
Sam Borland (Dr in port folio) [illegible]